US010819937B2

(12) United States Patent
Bao (10) Patent No.: US 10,819,937 B2
(45) Date of Patent: Oct. 27, 2020

(54) INTERFACE DISPLAY METHOD AND TELEVISION SYSTEM (71) Applicant: SHENZHEN TCL DIGITAL TECHNOLOGY LTD., Shenzhen, Guangdong (CN)

(72) Inventor: Linyu Bao, Guangdong (CN)

(73) Assignee: SHENZHEN TCL DIGITAL TECHNOLOGY LTD., Shenzhen (CN)

(*) Notice: Subject to any disclaimer, the term of this patent is extended or adjusted under 35 U.S.C. 154(b) by 118 days.

(21) Appl. No.: 16/322,477

(22) PCT Filed: Dec. 27, 2016

(86) PCT No.: PCT/CN2016/112252
§ 371 (c)(1),
(2) Date: Jan. 31, 2019

(87) PCT Pub. No.: WO2018/028120
PCT Pub. Date: Feb. 15, 2018

(65) Prior Publication Data
US 2020/0252572 A1 Aug. 6, 2020

(30) Foreign Application Priority Data

Aug. 9, 2016 (CN) .......................... 2016 1 0653948

(51) Int. Cl.
G09G 5/00 (2006.01)
H04N 5/44 (2011.01)
(Continued)

(52) U.S. Cl.
CPC ....... H04N 5/4403 (2013.01); H04N 5/44582 (2013.01); H04N 21/42204 (2013.01);
(Continued)

(58) Field of Classification Search
CPC ........... G09G 5/00; H04N 5/44; H04N 5/445; H04N 5/4403; H04N 5/44582;
(Continued)

(56) References Cited

U.S. PATENT DOCUMENTS 8,132,107 B2 * 3/2012 Honma .............. H04N 1/00408
715/740
8,760,448 B2 * 6/2014 Lee ........................ G06F 3/0483
345/419
(Continued)

FOREIGN PATENT DOCUMENTS

CN 103150085 A 6/2013
CN 103634636 A 3/2014
(Continued)

OTHER PUBLICATIONS

Search Report of counterpart European Patent Application No. 16912573.9 dated Dec. 2, 2019.
(Continued)

Primary Examiner — Trang U Tran (57) ABSTRACT

Disclosed is an interface display method, including: acquiring a button value and judging whether the acquired button value is a button value associated with any one of the shortcut applications, if yes, sending a first preset message and a second preset message to each of the shortcut applications; when a first shortcut application having an application identifier being different from the application identifier carried by the first preset message receives the first preset message, judging whether an application interface is in a display state, if yes, terminating the display of the application interface; when a second shortcut application having an application identifier being the same as the application identifier carried by the first preset message receives the first preset message and the second preset message, judging whether an application interface is in a
(Continued)

display state, if yes, terminating the display of the application interface, or else displaying the application interface.

20 Claims, 4 Drawing Sheets

(51) Int. Cl.
*H04N 5/445* (2011.01)
*H04N 21/443* (2011.01)
*H04N 21/422* (2011.01)

(52) U.S. Cl.
CPC ............... *H04N 21/4438* (2013.01); *H04N 2005/4408* (2013.01); *H04N 2005/4412* (2013.01)

(58) Field of Classification Search
CPC ......... H04N 21/42204; H04N 21/4438; H04N 2005/4408; H04N 2005/4412; G06F 3/048; G06F 3/00
USPC ......... 345/650; 348/731, 563; 715/764, 811, 715/802
See application file for complete search history.

(56) References Cited

U.S. PATENT DOCUMENTS

| | | | |
|---|---|---|---|
| 8,775,968 B2 | 7/2014 | Chao | |
| 8,806,333 B2 * | 8/2014 | Bourke | G06F 9/455 715/248 |
| 9,292,196 B2 * | 3/2016 | Ording | G06F 3/0486 |
| 9,459,760 B2 * | 10/2016 | Weng | G06F 3/0482 |
| 9,817,486 B2 * | 11/2017 | Kwak | G06F 3/04842 |
| 10,063,923 B2 * | 8/2018 | Kang | H04N 21/4882 |
| 2011/0314427 A1 * | 12/2011 | Sundararajan | G06F 9/451 715/863 |
| 2013/0027612 A1 | 1/2013 | Miloseski et al. | |
| 2013/0242192 A1 | 9/2013 | Chen et al. | |
| 2014/0139741 A1 * | 5/2014 | Momosaki | H04N 21/47 348/553 |

FOREIGN PATENT DOCUMENTS

| | | |
|---|---|---|
| CN | 104168497 A | 11/2014 |
| CN | 105100951 A | 11/2015 |
| CN | 105407372 A | 3/2016 |
| CN | 105611376 A | 5/2016 |
| CN | 105704576 A | 6/2016 |
| CN | 105744328 A | 7/2016 |
| EP | 2555535 A1 | 2/2013 |
| JP | 2014102789 A | 6/2014 |

OTHER PUBLICATIONS

International Search Report of PCT Patent Application No. PCT/CN2016/112252 dated Apr. 27, 2017.

* cited by examiner

INTERFACE DISPLAY METHOD AND TELEVISION SYSTEM

TECHNICAL FIELD

The present application relates to the technical field of television, in particular, to an interface display method and a television system.

BACKGROUND

With the development of television technology, many shortcut applications have been implanted in a television, such as application of setting, signal source, 3D, T buttons, etc. Correspondingly, the television's remote controller is equipped with shortcut buttons such as setting buttons, source buttons, 3D buttons, and T buttons associated with these shortcut applications. When a user presses a shortcut button on the remote controller, the television will call up an application interface corresponding to the shortcut application for user to operate. In the meanwhile, in order to prevent the shortcut applications from overlapping with each other, the shortcut applications are usually started by broadcasting in the prior art. Specifically, after the user presses the shortcut button, the television system will send a unique broadcast, and each application implanted in the television system will judge whether it needs to be displayed or not after receiving the broadcast. However, the broadcast is prone to result a blocking, so that the target application fails to receive the broadcast and to start the application. In addition, the television system will load a large amount of resources during the starting-up period of the television, resulting in a delay of broadcast transmission and a slow start-up of the target application.

SUMMARY

The present application mainly aims to provide an interface display method and a television system, realizing a quick start of shortcut application and mutually exclusive display.

To achieve the objective aforementioned, the present application provides an interface display method applied to a television system including a system processing layer and at least two shortcut applications. The interface display method includes the following steps:

executing a message registration operation by each of the shortcut applications, to obtain permission to receive a first preset message and a second preset message;

acquiring a button value sent from the remote controller by the system processing layer, and judging whether the acquired button value is a button value associated with any one of the shortcut applications;

distributing the acquired button value by the system processing layer, when the acquired button value is not the button value associated with any one of the shortcut applications;

sending the first preset message and the second preset message to each of the shortcut applications, when the acquired button value is the button value associated with any one of the shortcut applications, wherein, the first preset message and the second preset message carry an application identifier of the shortcut application associated with the button value;

when a first shortcut application having an application identifier being different from the application identifier carried by the first preset message receives the first preset message, judging whether an application interface of the first shortcut application is in a display state or not, if yes, terminating the display of the application interface of the first shortcut application; when a second shortcut application having an application identifier being the same as the application identifier carried by the first preset message receives the first preset message and the second preset message, judging whether an application interface of the second shortcut application is in a display state or not, if yes, terminating the display of the application interface of the second shortcut application, or else displaying the application interface of the second shortcut application.

Optionally, acquiring a button value sent from the remote controller by the system processing layer, includes:

searching for the button value sent from the remote controller in a preset file associating with a physical button by the system processing layer.

Optionally, the preset file of the associated physical button includes a PhoneWindowMananger.java file.

Additionally, to achieve objective aforementioned, the present application further provides an interface display method applied to a television system including a system processing layer and at least two shortcut applications. The interface display method includes the following steps:

acquiring a button value sent from the remote controller by the system processing layer and judging whether the acquired button value is a button value associated with any one of the shortcut applications, if yes, sending a first preset message and a second preset message to each of the shortcut applications, wherein, the first preset message and the second preset message carry an application identifier of each of the shortcut applications associated with the button value.

when a first shortcut application having an application identifier being different from the application identifier carried by the first preset message receives the first preset message, judging whether an application interface of the first shortcut application is in a display state or not, if yes, terminating the display of the application interface of the first shortcut application; when a second shortcut application having an application identifier being the same as the application identifier carried by the first preset message receives the first preset message and the second preset message, judging whether an application interface of the second shortcut application is in a display state or not, if yes, terminating the display of the application interface of the second shortcut application, or else displaying the application interface of the second shortcut application.

Optionally, after the operation of acquiring a button value sent from the remote controller by the system processing layer and judging whether the acquired button value is a button value associated with any one of the shortcut applications, the method further includes:

distributing the obtained key pressing value by the system processing layer, when the obtained key pressing value is not the key pressing value associated with any one of the shortcut applications.

Optionally, before the operation of acquiring a button value sent from the remote controller by the system processing layer, the method further includes:

executing a message registration operation by each of the shortcut applications, to obtain permission to receive a first preset message and a second preset message.

Optionally, acquiring a button value sent from the remote controller by the system processing layer, includes:

searching for the button value sent from the remote controller in a preset file associating with a physical button by the system processing layer.

Optionally, the preset file of the associated physical button includes a PhoneWindowMananger.java file.

Additionally, to achieve the objective aforementioned, the present application further provides a television system including a system processing layer and at least two shortcut applications, in which, the system processing layer is configured to acquire the button value sent from the remote controller and to judge whether the acquired button value is a button value associated with any shortcut application, if yes, a first preset message and a second preset message are sent to each of the shortcut applications, in which, the first preset message and the second preset message carry an application identifier of each of the shortcut applications associated with the button value;

a first shortcut application of which an application identifier is different from the application identifier carried by the first preset message, is configured to judge whether an application interface of the first shortcut application is in a display state or not, when receiving the first preset message, and if yes, the display of the application interface is terminated;

a second shortcut application of which the application identifier is the same as the application identifier carried by the first preset message, is configured to judge whether an application interface of the second shortcut application is in a display state or not, when receiving the first preset message and the second preset message. If yes, display is terminated of the application interface of the second shortcut application; otherwise application interface of the second shortcut application is displayed.

Optionally, the system processing layer is further configured to distribute the acquired button value by the system processing layer, when the acquired button value is not a button value associated with any one of the shortcut applications.

Optionally, each of the shortcut applications performs a message registration operation to obtain permission to receive the first preset message and the second preset message.

Optionally, the system processing layer is further configured to search for the button value sent from the remote controller in a preset file associating with a physical button.

Optionally, the preset file of the associated physical button includes a PhoneWindowMananger.java file.

The interface display method and the television system proposed in the present application, does not send button values in a broadcast manner when responding to shortcut buttons associated with shortcut applications on the remote controller, but directionally sends the first preset messages and the second preset messages to each shortcut application, thereby avoiding the defects of the broadcast manner, quickly transmitting button events to each shortcut application, and performing actions indicated by the first preset messages and the second preset messages by each shortcut application to realize mutually exclusive display of the application interfaces of shortcut applications.

The implementation, functional features and advantages of the present application will be further described with reference to the accompanying drawings with the embodiments.

DETAILED DESCRIPTION OF THE EMBODIMENTS

It should be understood that the specific embodiments described herein are only for the purpose of explaining the present application and are not intended to limit the present application.

Figure 1:
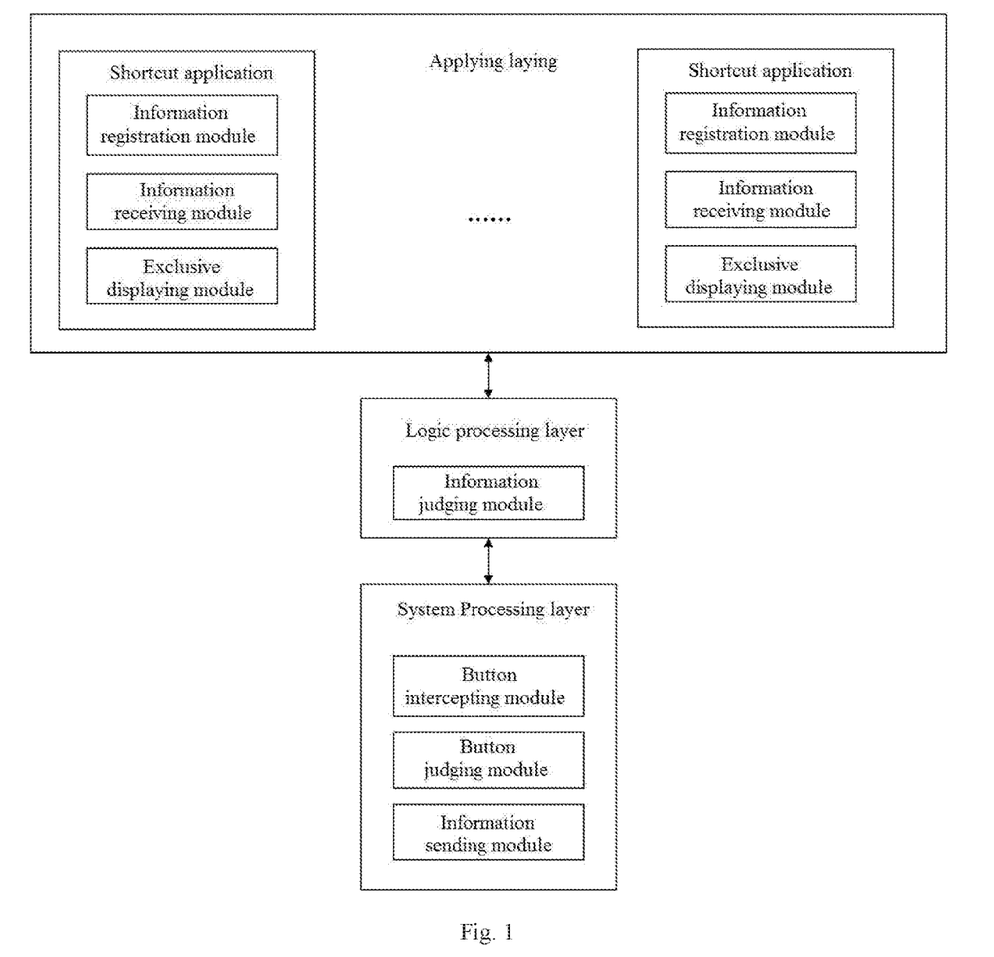
FIG. 1 is a framework diagram of a television system to which the interface display method of the present application is applied.

The present application provides an interface display method, which is applied to the television system shown in FIG. 1. As shown in FIG. 1, the television system comprises a system processing layer, a logic processing layer and an application layer, in which, the application layer includes at least two shortcut applications.

Figure 2:
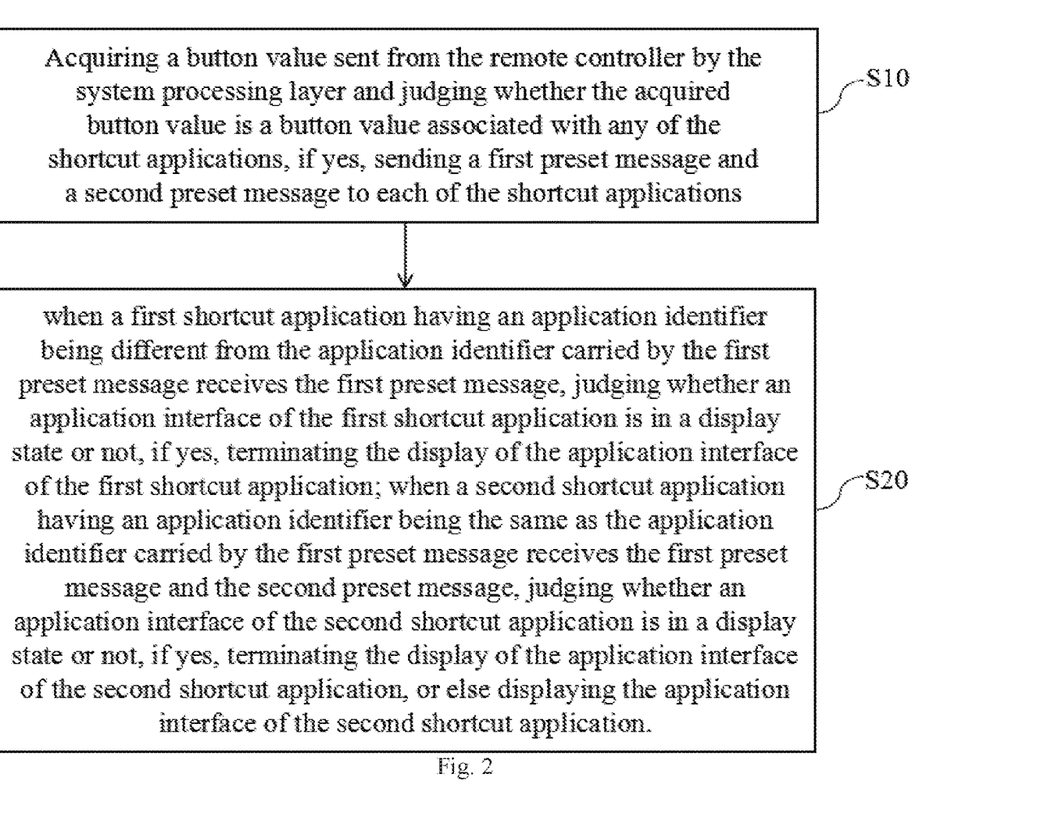
FIG. 2 is a flowchart of a first embodiment of the interface display method of the present application.

Referring to FIG. 2, in the first embodiment of the interface display method of the present application, the interface display method includes:

Step S10: acquiring a button value sent from the remote controller by the system processing layer and judging whether the acquired button value is a button value associated with any one of the shortcut applications, if yes, sending a first preset message and a second preset message to each of the shortcut applications, wherein, the first preset message and the second preset message carry an application identifier of each of the shortcut applications associated with the button value.

As shown in FIG. 1, in the embodiment of the present application, the system processing layer specifically includes a button intercepting module, a button judging module and an message sending module, and the shortcut application includes a message receiving module. The step 10 aforementioned includes:

searching the button value sent by the remote controller in the physical button-associated preset file by the button intercepting module and transmitting the searched button value to the button judging module;

judging whether the button value is a button value associated with any one of the shortcut applications by the button judging module is configured to, and if yes, transmitting the shortcut application information associated with the button value to the message sending module;

sending the first preset message and the second preset message carrying the application identifier of the shortcut application associated with the button value by the message sending module, to each of the message receiving modules, according to the received shortcut application information.

It should be noted that the television system described in the present embodiment will be described below based on the Android system as an example. As is known to those skilled in the art, the Android system can be logically divided into a driving layer, an application frame layer and an application layer, in which, the received induced electric signal is converted into a button value associated with the remote controller button and then the button value is reported to the application framework layer, when the driving layer receives an induced electric signal generated by the remote controller in response to a user button. Specifically the button value is reported to the file of PhoneWindow-Mananger.java in the application framework layer.

In the embodiment of the present application, the button intercepting module searches for the button value sent by the remote controller in the PhoneWindowMananger.java file (i.e., the preset file associated with the physical button) and transmits the searched button value to the button judging module, to provide premise for the button judging module. For example, when the user presses the setting button of the remote controller, the button intercepting module will search the button value "0001" in the file of PhoneWindowMananger.java and transmits the searched button value "0001" to the button judging module. When the user presses the source button of the remote controller, the button intercepting module will search the button value "0010" in the file of PhoneWindowMananger.java and transmits the searched button value "0010" to the button judging module.

After receiving the button value transmitted from the button interception module, the button judgment module first judges whether the remote control button associated with the received button value is a shortcut button, and judges whether the received button value is a button value associated with any one of the shortcut applications according to a specific mapping of the pre-stored button values and the shortcut applications. If the button pressed on the remote control associated with the received button value is a shortcut button, the button judging module further judges the type of the shortcut button, that is, determines which shortcut application is specifically associated with the received button value, and transmits information of the shortcut application associated with the button value to the message sending module. In which, the application identifier of the shortcut application can be used as the shortcut application information for transmission. For example, the application identifier "Setting" for transmitting the application of setting, the application identifier "Source" for transmitting the application of source, etc.

The message sending module sends the first preset message and the second preset message to the message receiving module of each of the shortcut applications, after receiving the shortcut application information transmitted by the button judging module. In which, the first preset message is configured to indicate the executing action "dismiss" after receiving the first preset message, and the second preset message is configured to indicate the executing action "start" after receiving second preset message. Both the first preset message and second preset message carry the application identifier of the shortcut application, in which the application identifier is associated with the button value intercepted by the button interception module.

For example, when the shortcut application associated with the button value intercepted by the button interception module is the application of setting, the first preset message sent by the message sending module is as follows:

Intent mIntent=new Intent( );
   mIntent.setAction("com.tcl.quickmenu.dismiss");
   Bundle bundle=new Bundle( );
   bundle.putString("Type","Setting"); //Carry Application Identified as Setting
   mIntent.putExtras(bundle);
   mContext.startService(mIntent);

The second preset messages sent by the message sending module are as follows:
   mIntent.setClassName("com.tcl.settings","com.tcl.settings.ShowWindowService");
   mIntent.putExtra("flag", 1);
   mIntent.putExtra("Type", "Settings"); //Carry Application Identified as Setting
   mIntent.setFlags(Intent.FLAG_ACTIVITY_NEW_TASK);
   mIntent.setAction("com.tcl.settings.SHOW_WINDOW");
   mContext.startService(mIntent);

As another example, when the shortcut application associated with the button value intercepted by the button intercepting module is the application of source, the first preset message sent by the message sending module is as follows:

Intent mIntent=new Intent( );
   mIntent.setAction("com.tcl.quickmenu.dismiss");
   Bundle bundle=new Bundle( );
   bundle.putString("Type","Source"); //The carrying parameter is Source
   mIntent.putExtras(bundle);
   mContext.startService(mIntent);

The second preset messages sent by the message sending module are as follows:
   mIntent.setClassName("com.tcl.sources","com.tcl.sources.ShowWindowService");
   mIntent.putExtra("flag", 1);
   mIntent.putExtra("Type", "Sources");
   mIntent.setFlags(Intent.FLAG_ACTIVITY_NEW_TASK);
   mIntent.setAction("com.tcl.sources.SHOW_WINDOW");
   mContext.startService(mIntent);

Alternatively, when sending the first preset message and the second preset message, the message sending module first sends the first preset message indicating the action of "dismiss" and then sends the second preset message indicating the action of "start".

Step S20, when a first shortcut application having an application identifier being different from the application identifier carried by the first preset message receives the first preset message, judging whether an application interface of the first shortcut application is in a display state or not, if yes, terminating the display of the application interface of the first shortcut application; when a second shortcut application having an application identifier being the same as the application identifier carried by the first preset message receives the first preset message and the second preset message, judging whether an application interface of the second shortcut application is in a display state or not, if yes, terminating the display of the application interface of the second shortcut application, or else displaying the application interface of the second shortcut application.

As shown in FIG. 1, in the present embodiment, the logic processing layer includes a message judging module. The shortcut application transmits the first preset message to the message judging module when receiving the first preset message, so that the message judging module can judge whether the application identifier carried by the first preset message is the application identifier of the shortcut application, and return the judgment result to the shortcut application.

As shown in FIG. 1, the shortcut application further includes a mutually exclusive display module. The message judging module judges whether the message received by the message receiving module is a first preset message or a second preset message, when receiving the message transmitted by the message receiving module. If not, no processing is performed. If yes, the message judging module further judges whether the application identifier carried by the first preset message or the second preset message received by the message receiving module is the same as the application identifier associated with the shortcut application in which the message receiving module is located, and transmits the judgment result to the mutually exclusive display module of the shortcut application.

When the mutually exclusive display module of a shortcut application receives the judgment result of the first preset message returned by the message judging module, and judgment result is no of the first preset message received by the message receiving module, that is, the application identifier carried by the first preset message is not the application identifier of the shortcut application where it is located (i.e., the first shortcut application). It is judged whether the application interface of the first shortcut application is in a display state or not. If yes, the application interface of the first shortcut application is terminated, otherwise, no processing is performed.

When the mutually exclusive display module of another shortcut application receives the first preset message returned by the message judging module, and judgment result is yes of the first preset message received by the message receiving module, and the message receiving module receives the second preset message. Since the application identifier carried by the first preset message is the same as the application identifier of the shortcut application where it is located, it is judged whether the application interface of the first shortcut application (i.e. the second shortcut application) is in a display state or not. If yes, the application interface of the first shortcut application is terminated; otherwise, the application interface of the second shortcut application is displayed.

Up until now, description of the functional implementation of the interface display method of the present application has been completed, taking the television system including the applications of setting and source as an example. Based on the above description, those skilled in the art can clearly understand the effects of the present application.

1. When it is displayed at the application interface of the application of setting and the user presses the source button on the remote controller, the television will stop displaying the application interface of the application of setting and display the application interface of the application of source instead.

2. When it is displayed at the application interface for setting the application and the user presses the setting button of the remote controller, the television will stop displaying the application interface for setting the application.

3. When it is not displayed at the application interface for setting the application and the user presses the setting button on the remote controller, the television will display the application interface for setting the application.

Figure 3:
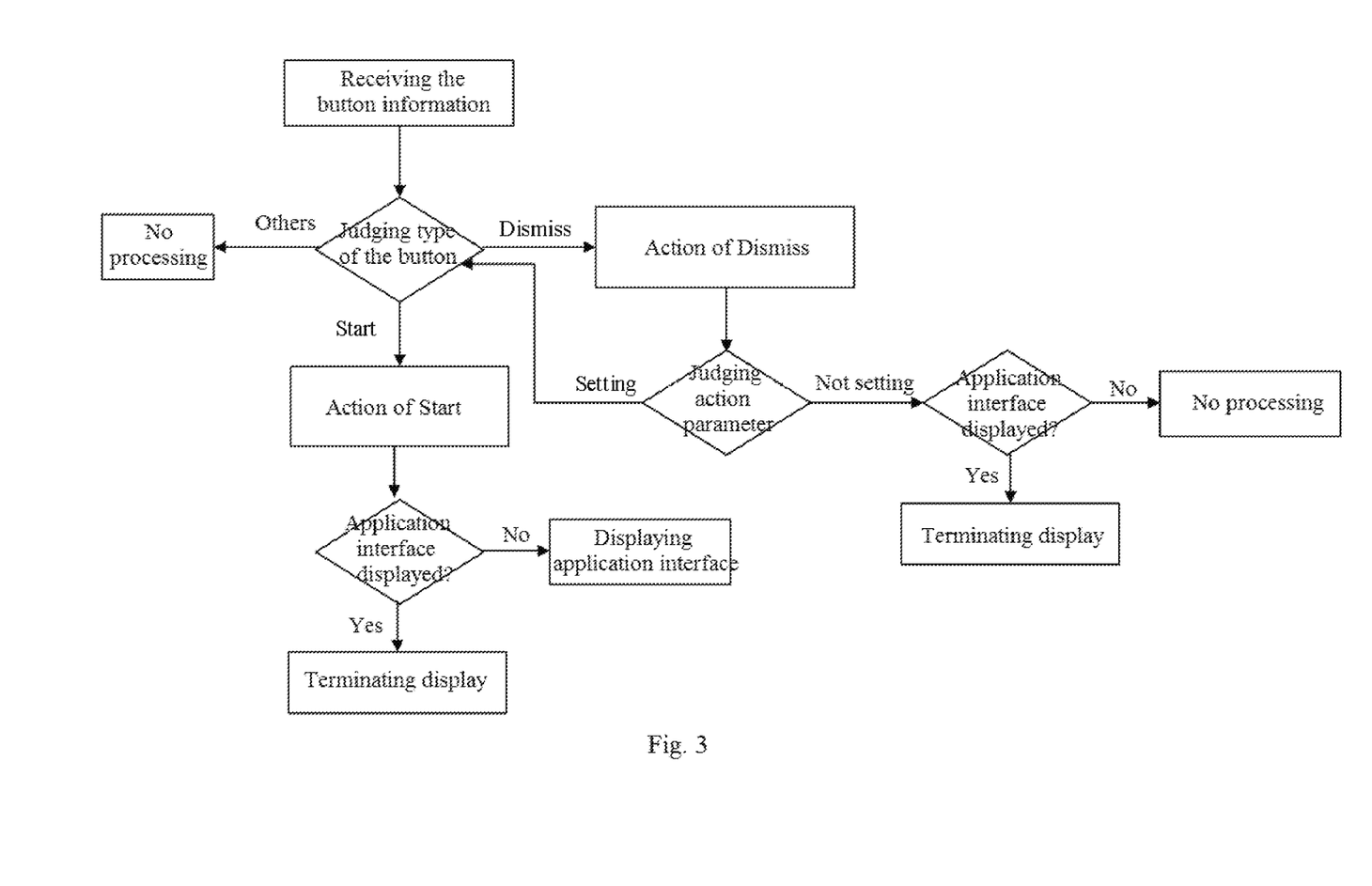
FIG. 3 is a response flow schematic diagram of setting the application to receive a first preset message and a second preset message in the first embodiment of the interface display method of the present application.

In addition, FIG. 3 can be referred to, which illustrates a response flow diagram that the application of setting receives the first preset message (i.e., the action of the dismiss shown in FIG. 3) and the second preset message (i.e., the action of the start shown in FIG. 3).

The interface display method proposed in the present embodiment is applied to the television system, so that the television system does not send button values in a broadcast manner when responding to shortcut buttons associated with shortcut applications on the remote controller, but directionally sends the first preset messages and the second preset messages to each shortcut application, thereby avoiding the defects of the broadcast manner, quickly transmitting button events to each shortcut application, and performing actions indicated by the first preset messages and the second preset messages by each shortcut application to realize mutually exclusive display of the application interfaces of shortcut applications.

Further, based on the first embodiment, the second embodiment of the interface display method of the present application is proposed. In the present embodiment, after the operation of acquiring the button value sent from the remote controller by the system processing layer and judging whether the acquired button value is the button value associated with any one of the shortcut applications, the method further includes:

When the acquired button value is not a button value associated with any one of the shortcut applications, the system processing layer distributes the acquired button value.

It should be noted that the present embodiment further describes the operation performed by the system processing layer when it receives a button value that does not associated with any one of the shortcut applications on the basis of the first embodiment, and other operations can be referred to the first embodiment and will not be described herein.

In the embodiments of the present application, after the button judging module judges whether or not the remote control button which is associated with the button value received by the button intercepting module is a shortcut button, that is, whether the acquired button value is a button value associated with any one of the shortcut applications, if the remote control button associated with the button value received by the button intercepting module is not a shortcut button, the button judging module distributes the acquired button value, and, processing is performed by the application who received the carried button value information, according to actual needs.

Figure 4:
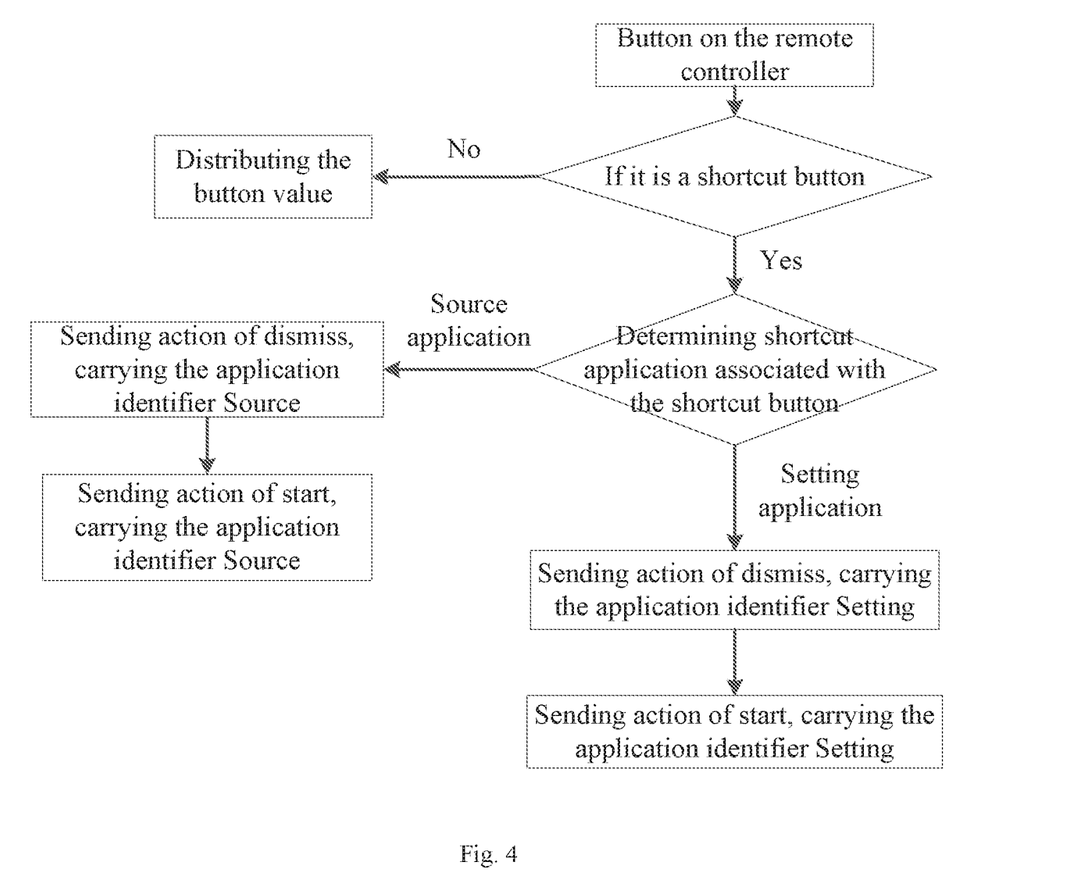
FIG. 4 is a response flow diagram of showing that system processing layer receives the button value sent from the remote controller in the second embodiment of the interface display method of the present application.

In addition, FIG. 4 can be referred to, which is a response flow diagram when the system processing layer receives the button value of the remote controller.

Further, based on the first embodiment, a third embodiment of the interface display method of the present application is proposed. In the present embodiment, before step S10, the method further includes:

executing a message registration operation by each of the shortcut applications, to obtain permission to receive a first preset message and a second preset message.

It should be noted that, message registration is required in order to receive the first preset messages and the second preset messages sent from the message sending module by the message receiving module. The following description will only focus on the message registration operation. Other embodiments can be referred to, and details will not be described herein.

In the present embodiment, the shortcut application further includes a message registration module, which is configured to complete the message registration operation. Specifically, taking the application of setting as an example, registration is necessary in the AndroidManifest.xml file of the shortcut application in the following manner:

```
<service android:name="com.tcl.settings.ShowWindowService">
  <intent-filter>
    <action android:name="com.tcl.settings.SHOW_WINDOW"/>
    <action android:name="com.tcl.quickmenu.dismiss"/>
  </intent-filter>
</service>
```

In which, "com.tcl.settings.SHOW_WINDOW" is configured to characterize the second preset messages, and "com. tcl. quickmenu. dismiss" is configured to characterize the first preset messages.

The present application further provides a television system for executing the interface display method aforementioned. Referring to FIG. 1, the television system includes a system processing layer, a logic processing layer and an application layer, in which, the application layer comprises at least two shortcut applications associated with the first embodiment of the interface display method aforementioned in the present embodiment. In the present embodiment, the system processing layer is configured to acquire the button value sent from the remote controller and to judge whether the acquired button value is a button value associated with any shortcut application, if yes, a first preset message and a second preset message are sent to each of the shortcut applications, in which, the first preset message and the second preset message carry an application identifier of each of the shortcut applications associated with the button value;

a first shortcut application of which an application identifier is different from the application identifier carried by the first preset message, is configured to judge whether an application interface of the first shortcut application is in a display state or not, when receiving the first preset message, and if yes, the display of the application interface is terminated;

a second shortcut application of which the application identifier is the same as the application identifier carried by the first preset message, is configured to judge whether an application interface of the second shortcut application is in a display state or not, when receiving the first preset message and the second preset message. If yes, display is terminated of the application interface of the second shortcut application; otherwise application interface of the second shortcut application is displayed.

As shown in FIG. 1, in the embodiment of the present application, the system processing layer specifically includes a button intercepting module, a button judging module and an message sending module, and the shortcut application includes a message receiving module, in which, the button intercepting module is configured to search in the preset file associated with the physical button the button value sent by the remote controller and to transmit the searched button value to the button judging module.

The button judging module is configured to judge whether the button value is a button value associated with any one of the shortcut applications. And if yes, the shortcut application information is transmitted associated with the button value to the message sending module.

The message sending module sends the first preset message and the second preset message carrying the application identifier of the shortcut application associated with the button value to each of the message receiving modules, according to the received shortcut application information.

It should be noted that the television system described in the present embodiment will be described below based on the Android system as an example. As is known to those skilled in the art, the Android system can be logically divided into a driving layer, an application frame layer and an application layer, in which, the received induced electric signal is converted into a button value associated with the remote controller button and then the button value is reported to the application framework layer, when the driving layer receives an induced electric signal generated by the remote controller in response to a user button. Specifically the button value is reported to the file of PhoneWindowMananger.java in the application framework layer.

In the embodiment of the present application, the button intercepting module searches for the button value sent by the remote controller in the PhoneWindowMananger.java file (i.e., the preset file associated with the physical button) and transmits the searched button value to the button judging module, to provide premise for the button judging module. For example, when the user presses the setting button of the remote controller, the button intercepting module will search the button value "0001" in the file of PhoneWindowMananger.java and transmits the searched button value "0001" to the button judging module. When the user presses the source button of the remote controller, the button intercepting module will search the button value "0010" in the file of PhoneWindowMananger.java and transmits the searched button value "0010" to the button judging module.

After receiving the button value transmitted from the button interception module, the button judgment module first judges whether the remote control button associated with the received button value is a shortcut button, and judges whether the received button value is a button value associated with any one of the shortcut applications according to a specific mapping of the pre-stored button values and the shortcut applications. If the button pressed on the remote control associated with the received button value is a shortcut button, the button judging module further judges the type of the shortcut button, that is, determines which shortcut application is specifically associated with the received button value, and transmits information of the shortcut application associated with the button value to the message sending module. In which, the application identifier of the shortcut application can be used as the shortcut application information for transmission. For example, the application identifier "Setting" for transmitting the application of setting, the application identifier "Source" for transmitting the application of source, etc.

The message sending module sends the first preset message and the second preset message to the message receiving module of each of the shortcut applications, after receiving the shortcut application information transmitted by the button judging module. In which, the first preset message is configured to indicate the executing action "dismiss" after receiving the first preset message, and the second preset message is configured to indicate the executing action "start" after receiving second preset message. Both the first preset message and second preset message carry the application identifier of the shortcut application, in which the application identifier is associated with the button value intercepted by the button interception module.

For example, when the shortcut application associated with the button value intercepted by the button interception module is the application of setting, the first preset message sent by the message sending module is as follows:
 Intent mIntent=new Intent( );
 mIntent.setAction("com.tcl.quickmenu.dismiss");
 Bundle bundle=new Bundle( );
 bundle.putString("Type","Setting"); //Carry Application Identifier of Setting
 mIntent.putExtras(bundle);
 mContext.startService(mIntent);
The second preset messages sent by the message sending module are as follows:
 mIntent.setClassName("com.tcl.settings","com.tcl.settings.ShowWindowService");
 mIntent.putExtra("flag", 1);

mIntent.putExtra("Type", "Settings"); //Carry Application Identifier of Setting
mIntent.setFlags(Intent.FLAG_ACTIVITY_NEW_TASK);
mIntent.setAction("com.tcl.settings.SHOW_WINDOW");
mContext.startService(mIntent);

For another example, when the shortcut application associated with the button value intercepted by the button interception module is the application of source, the first preset message sent by the message sending module is as follows:
Intent mIntent=new Intent( );
mIntent.setAction("com.tcl.quickmenu.dismiss");
Bundle bundle=new Bundle( );
bundle.putString("Type","Source"); //The carrying parameter is Source
mIntent.putExtras(bundle);
mContext.startService(mIntent);

The second preset messages sent by the message sending module are as follows:
mIntent.setClassName("com.tcl.sources","com.tcl.sources.ShowWindowService");
mIntent.putExtra("flag", 1);
mIntent.putExtra("Type", "Sources");
mIntent.setFlags(Intent.FLAG_ACTIVITY_NEW_TASK);
mIntent.setAction("com.tcl.sources.SHOW_WINDOW");
mContext.startService(mIntent);

Alternatively, when sending the first preset message and the second preset message, the message sending module first sends the first preset message indicating the action of "dismiss" and then sends the second preset message indicating the action of "start".

As shown in FIG. 1, in the present embodiment, the logic processing layer includes a message judging module. The shortcut application is further configured to transmit the first preset message to the message judging module when receiving the first preset message, so that the message judging module can judge whether the application identifier carried by the first preset message is the application identifier of the shortcut application, and return the judgment result to the shortcut application.

As shown in FIG. 1, the shortcut application further includes a mutually exclusive display module. The message judging module judges whether the message received by the message receiving module is a first preset message or a second preset message, when receiving the message transmitted by the message receiving module. If not, no processing is performed. If yes, the message judging module further judges whether the application identifier carried by the first preset message or the second preset message received by the message receiving module is the same as the application identifier associated with the shortcut application in which the message receiving module is located, and transmits the judgment result to the mutually exclusive display module of the shortcut application.

When the mutually exclusive display module of a shortcut application receives the judgment result of the first preset message returned by the message judging module, and judgment result is no of the first preset message received by the message receiving module, that is, the application identifier carried by the first preset message is not the application identifier of the shortcut application where it is located (i.e., the first shortcut application). It is judged whether the application interface of the first shortcut application is in a display state. If yes, the application interface of the first shortcut application is terminated, otherwise, no processing is performed.

When the mutually exclusive display module of another shortcut application receives the first preset message returned by the message judging module, and judgment result is yes of the first preset message received by the message receiving module, and the message receiving module receives the second preset message. Since the application identifier carried by the first preset message is the same as the application identifier of the shortcut application where it is located, it is judged whether the application interface of the first shortcut application (i.e. the second shortcut application) is in a display state or not. If yes, the application interface of the first shortcut application is terminated; otherwise, the application interface of the second shortcut application is displayed.

Up until now, description of the functional implementation of the television system of the present application has been completed, taking the television system including the applications of setting and source as an example. Based on the above description, those skilled in the art can clearly understand the effects of the present application.

1. When it is displayed at the application interface of the application of setting and the user presses the source button on the remote controller, the television will stop displaying the application interface of the application of setting and display the application interface of the application of source instead.

2. When it is displayed at the application interface for setting the application and the user presses the setting button of the remote controller, the television will stop displaying the application interface for setting the application.

3. When it is not displayed at the application interface for setting the application and the user presses the setting button on the remote controller, the television will display the application interface for setting the application.

In addition, FIG. 3 can be referred to, which illustrates a response flow diagram that the application of setting receives the first preset message (i.e., the action of the dismiss shown in FIG. 3) and the second preset message (i.e., the action of the start shown in FIG. 3).

The television system proposed in the present embodiment does not send button values in a broadcast manner when responding to shortcut buttons associated with shortcut applications on the remote controller, but directionally sends the first preset messages and the second preset messages to each shortcut application, thereby avoiding the defects of the broadcast manner, quickly transmitting button events to each shortcut application, and performing actions indicated by the first preset messages and the second preset messages by each shortcut application to realize mutually exclusive display of the application interfaces of shortcut applications.

Further, based on the first embodiment, the second embodiment of the television system of the present application is proposed. Associated with the second embodiment of the interface display method aforementioned, the system processing layer in the present embodiment is further configured to distribute the acquired button value when the acquired button value is not the button value associated with any one of the shortcut applications.

It should be noted that the present embodiment further describes the operation performed by the system processing layer when it receives a button value that does not associated with any one of the shortcut applications on the basis of the first embodiment, and other operations can be referred to the first embodiment and will not be described herein.

In the embodiments of the present application, after the button judging module judges whether or not the remote control button which is associated with the button value received by the button intercepting module is a shortcut button, that is, whether the acquired button value is a button value associated with any one of the shortcut applications, if the remote control button associated with the button value received by the button intercepting module is not a shortcut button, the button judging module distributes the acquired button value, and, processing is performed by the application who received the carried button value information, according to actual needs.

In addition, FIG. 4 can be referred to, which is a response flow diagram when the system processing layer receives the button value of the remote controller.

Further, based on the first embodiment, the third embodiment of the television system of the present application is proposed. In the present embodiment. Associated with the third embodiment of the television system aforementioned, each shortcut application of the present embodiment is further configured to execute a message registration operation by each of the shortcut applications to obtain permission to receive the first preset message and the second preset message.

It should be noted that, message registration is required in order to receive the first preset messages and the second preset messages sent from the message sending module by the message receiving module. The following description will only focus on the message registration operation. Other embodiments can be referred to, and details will not be described herein.

In the present embodiment, the shortcut application further includes a message registration module, which is configured to complete the message registration operation. Specifically, taking the application of setting as an example, registration is necessary in the AndroidManifest.xml file of the shortcut application in the following manner:

```
<service android:name="com.tcl.settings.ShowWindowService">
  <intent-filter>
    <action android:name="com.tcl.settings.SHOW_WINDOW"/>
    <action android:name="com.tcl.quickmenu.dismiss"/>
  </intent-filter>
</service>
```

In which, "com.tcl.settings.SHOW_WINDOW" is configured to characterize the second preset messages, and "com. tcl. quickmenu. dismiss" is configured to characterize the first preset messages.

The above is only the preferred embodiment of the present application and is not therefore limiting the scope of the present application. Any equivalent structure or process change made by using the contents of the present specification and drawings, or directly or indirectly applied in other related technical fields, shall be included in the protection scope of the present application.

What is claimed is:

1. An interface display method, applied to a television system, wherein, the television system comprises a system processing layer and at least two shortcut applications, the interface display method comprises the following steps:
   executing a message registration operation by each of the shortcut applications, to obtain permission to receive a first preset message and a second preset message;
   acquiring a button value sent from a remote controller by the system processing layer, and judging whether the acquired button value is a button value associated with any one of the shortcut applications;
   distributing the acquired button value by the system processing layer, when the acquired button value is not the button value associated with any one of the shortcut applications;
   sending the first preset message and the second preset message to each of the shortcut applications, when the acquired button value is the button value associated with any one of the shortcut applications, wherein, the first preset message and the second preset message carry an application identifier of the shortcut application associated with the button value;
   when a first shortcut application having an application identifier being different from the application identifier carried by the first preset message receives the first preset message, judging whether an application interface of the first shortcut application is in a display state or not, if yes, terminating the display of the application interface of the first shortcut application; when a second shortcut application having an application identifier being the same as the application identifier carried by the first preset message receives the first preset message and the second preset message, judging whether an application interface of the second shortcut application is in a display state or not, if yes, terminating the display of the application interface of the second shortcut application, or else displaying the application interface of the second shortcut application.

2. The interface display method of claim 1, wherein, acquiring a button value sent from the remote controller by the system processing layer, comprises:
   inquiring the button value sent from the remote controller in a preset file associating with a physical button by the system processing layer.

3. The interface display method of claim 2, wherein, the preset file associating with the physical button comprises a PhoneWindowMananger.java file.

4. An interface display method, applied to a television system, wherein, the television system comprises a system processing layer and at least two shortcut applications, the interface display method comprises the following steps:
   acquiring a button value sent from a remote controller by the system processing layer and judging whether the acquired button value is a button value associated with any one of the shortcut applications, if yes, sending a first preset message and a second preset message to each of the shortcut applications, wherein, the first preset message and the second preset message carry an application identifier of the shortcut application associated with the button value;
   when a first shortcut application having an application identifier being different from the application identifier carried by the first preset message receives the first preset message, judging whether an application interface of the first shortcut application is in a display state or not, if yes, terminating the display of the application interface of the first shortcut application; when a second shortcut application having an application identifier being the same as the application identifier carried by the first preset message receives the first preset message and the second preset message, judging whether an application interface of the second shortcut application is in a display state or not, if yes, terminating the display of the application interface of the second shortcut application, or else displaying the application interface of the second shortcut application.

5. The interface display method of claim 4, wherein, after the operation of acquiring a button value sent from the remote controller by the system processing layer and judging whether the acquired button value is a button value associated with any one of the shortcut applications, the method further comprises:
distributing the acquired button value by the system processing layer, when the acquired button value is not a button value associated with any one of the shortcut applications.

6. The interface display method of claim 4, wherein, before the operation of acquiring a button value sent from the remote controller by the system processing layer, the method further comprises:
executing a message registration operation by each of the shortcut applications to obtain permission to receive the first preset message and the second preset message.

7. The interface display method of claim 4, wherein, acquiring a button value sent from the remote controller by the system processing layer, comprises:
inquiring the button value sent from the remote controller in a preset file associating with a physical button by the system processing layer.

8. The interface display method of claim 5, wherein, acquiring a button value sent from the remote controller by the system processing layer, comprises:
inquiring the button value sent from the remote controller in a preset file associating with a physical button by the system processing layer.

9. The interface display method of claim 6, wherein, acquiring a button value sent from the remote controller by the system processing layer, comprises:
inquiring the button value sent from the remote controller in a preset file associating with a physical button by the system processing layer.

10. The interface display method of claim 7, wherein, the preset file associating with the physical button comprises a PhoneWindowMananger.java file.

11. The interface display method of claim 8, wherein, the preset file associating with the physical button comprises a PhoneWindowMananger.java file.

12. The interface display method of claim 9, wherein, the preset file associating with the physical button comprises a PhoneWindowMananger.java file.

13. A television system, comprising a system processing layer and at least two shortcut applications, wherein,
the system processing layer is configured to acquire a button value sent from a remote controller and to judge whether the acquired button value is a button value associated with any one of the shortcut applications, if yes, a first preset message and a second preset message are sent to each of the shortcut applications, in which, the first preset message and the second preset message carry an application identifier of the shortcut application associated with the button value;
a first shortcut application of which an application identifier is different from the application identifier carried by the first preset message, is configured to judge whether an application interface of the first shortcut application is in a display state or not, when receiving the first preset message, and if yes, the display of the application interface is terminated;
a second shortcut application of which the application identifier is the same as the application identifier carried by the first preset message, is configured to judge whether an application interface of the second shortcut application is in a display state or not, when receiving the first preset message and the second preset message, if yes, the display of the application interface of the second shortcut application is terminated; otherwise the application interface of the second shortcut application is displayed.

14. The television system of claim 13, wherein, the system processing layer is further configured to distributes an acquired button value, when the acquired button value is not a button value associated with any one of the shortcut applications.

15. The television system of claim 13, wherein, each of the shortcut applications is further configured to execute a message registration operation to obtain permission to receive the first preset message and the second preset message.

16. The television system of claim 13, wherein, the system processing layer is further configured to inquire the button value sent from the remote controller in a preset file associating with a physical button.

17. The television system of claim 14, wherein, the system processing layer is further configured to inquire the button value sent from the remote controller in a preset file associating with a physical button.

18. The television system of claim 15, wherein, the system processing layer is further configured to inquire the button value sent from the remote controller in a preset file associating with a physical button.

19. The television system of claim 16, wherein, the preset file of the associated physical button comprises a PhoneWindowMananger.java file.

20. The television system of claim 17, wherein, the preset file of the associated physical button comprises a PhoneWindowMananger.java file.

\* \* \* \* \*